(12) United States Patent
Gregory et al.

(10) Patent No.: US 6,182,246 B1
(45) Date of Patent: Jan. 30, 2001

(54) PROTOCOL ACKNOWLEDGMENT BETWEEN HOMOGENEOUS SYSTEM

(75) Inventors: Peter R. Gregory, Medina; Ian Sample, Seattle; Shawn Michael Lucas, Kenmore; Jie H. Ding, Redmond; David Matthew Boyce, Kent; James Floyd Walters, Seattle, all of WA (US)

(73) Assignee: Bsquare Corporation, Bellevue, WA (US)

( * ) Notice: Under 35 U.S.C. 154(b), the term of this patent shall be extended for 0 days.

(21) Appl. No.: 09/588,104

(22) Filed: May 31, 2000

Related U.S. Application Data

(63) Continuation-in-part of application No. 09/489,308, filed on Jan. 21, 2000.
(60) Provisional application No. 60/137,629, filed on Jun. 4, 1999, and provisional application No. 60/116,824, filed on Jan. 21, 1999.

(51) Int. Cl.[7] .................................................... G06F 11/263
(52) U.S. Cl. ................................. 714/38; 714/46; 714/738
(58) Field of Search .................................. 714/38, 46, 33, 714/39, 738, 742; 703/17, 20, 21

(56) References Cited

U.S. PATENT DOCUMENTS

| | | | |
|---|---|---|---|
| 5,021,997 | * | 6/1991 | Archie et al. ........................ 364/900 |
| 5,600,789 | * | 2/1997 | Parker et al. .................... 395/183.14 |
| 5,600,790 | * | 2/1997 | Barnstijn et al. ............... 395/183.14 |
| 5,630,049 | * | 5/1997 | Cardoza et al. ................. 395/183.01 |
| 6,029,257 | * | 2/2000 | Palmer .................................. 714/40 |

* cited by examiner

Primary Examiner—Robert W. Beausoliel, Jr.
Assistant Examiner—Scott T. Baderman
(74) Attorney, Agent, or Firm—Laiviere, Grubman & Payne, LLP

(57) ABSTRACT

A testing and validating software program on a host computer is provided having a graphical user interface program, an engine communicating with a target device and responding to command from the graphical user interface, a plurality of test suites having at least one test for testing and validating at least one component of an operating system, and a protocol acknowledgment software package conducive to use with the target device, wherein the protocol acknowledgment software package uses an operating system-generated event handle as a member field of a protocol for releasing an execution thread which is waiting for an acknowledgment message from the target device, and wherein the event handle is placed in a header portion of an acknowledgment message packet and is sent back in the acknowledgment message, and wherein a receiving thread unblocks any send threads of execution which are waiting for the event handle in the acknowledgment message.

20 Claims, 25 Drawing Sheets

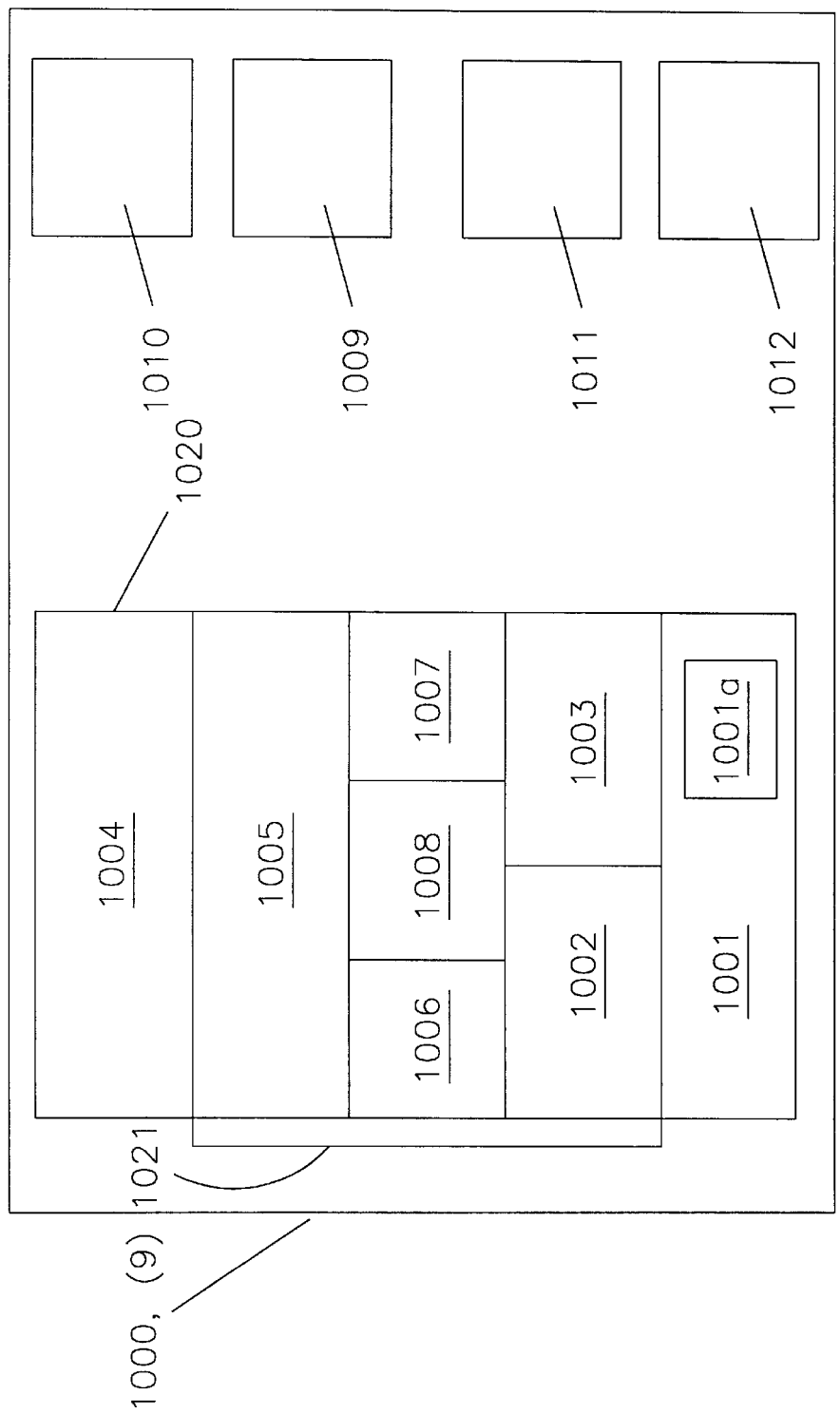
FIGURE 1.0

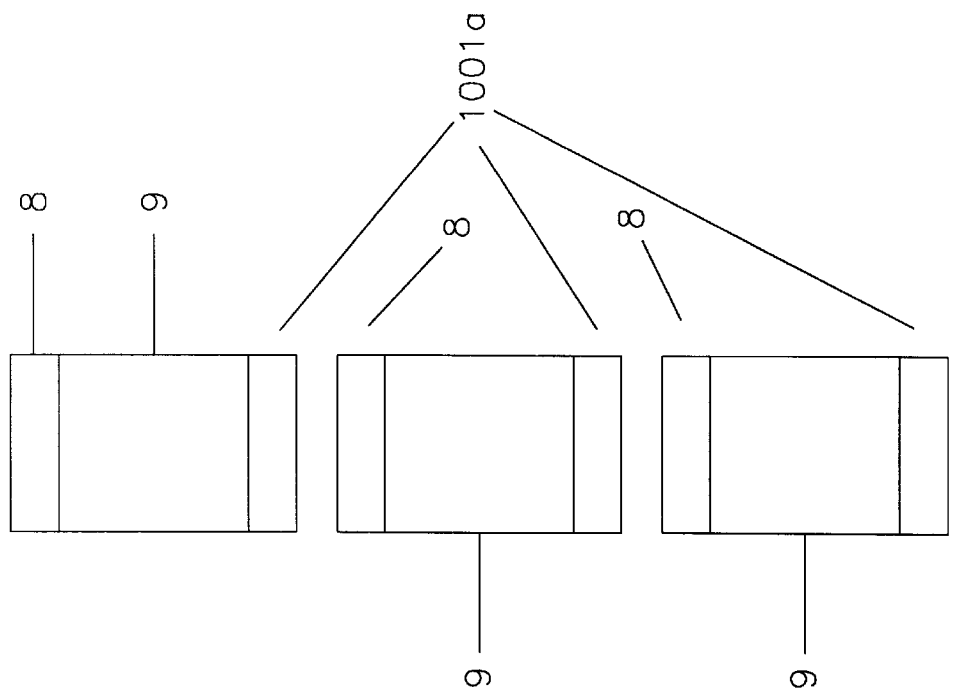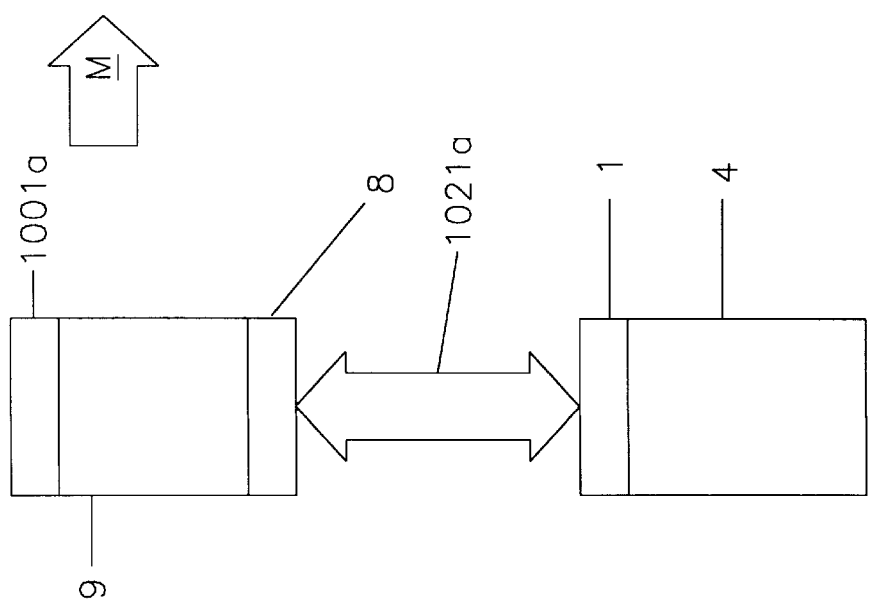
FIGURE 2.0

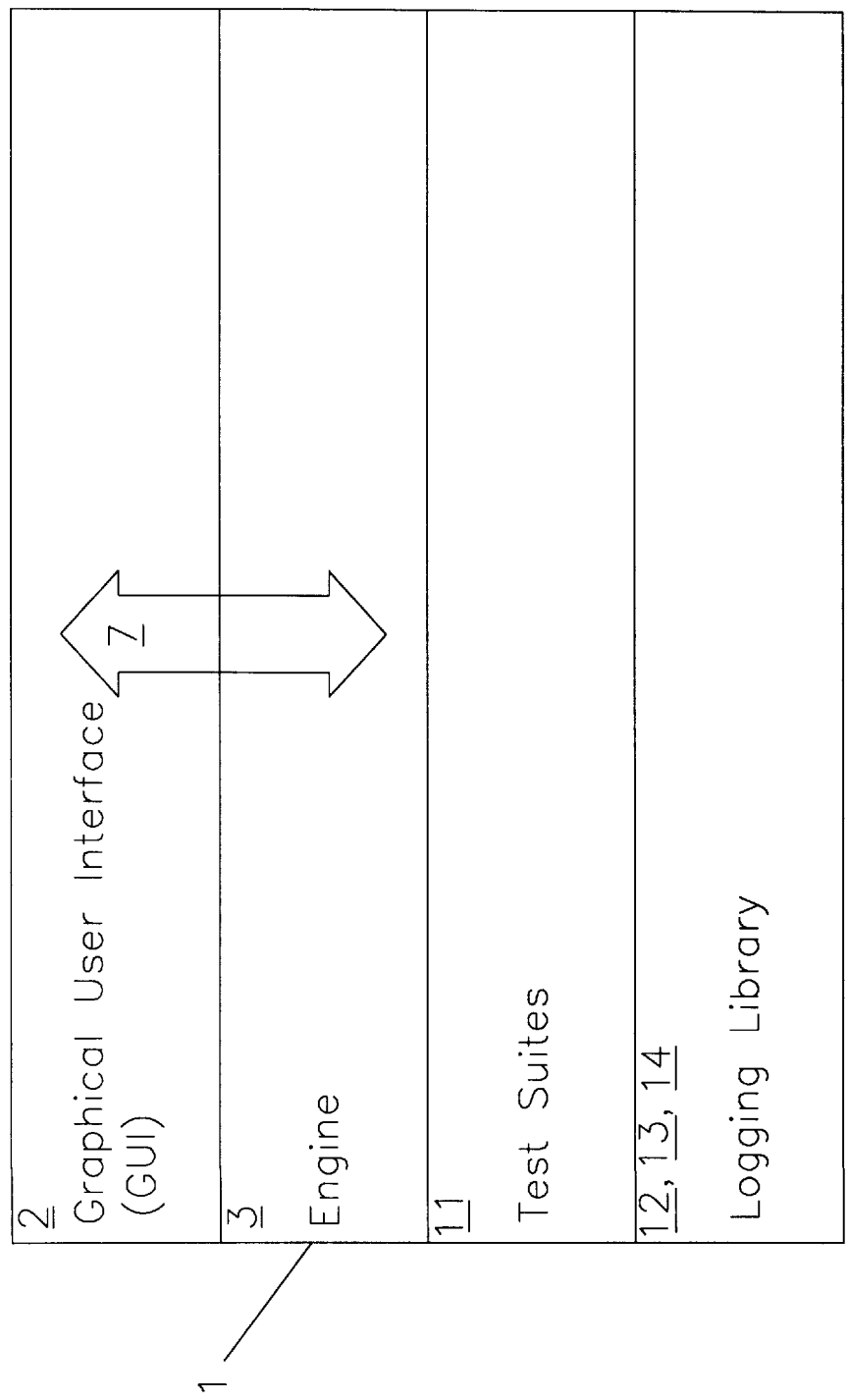

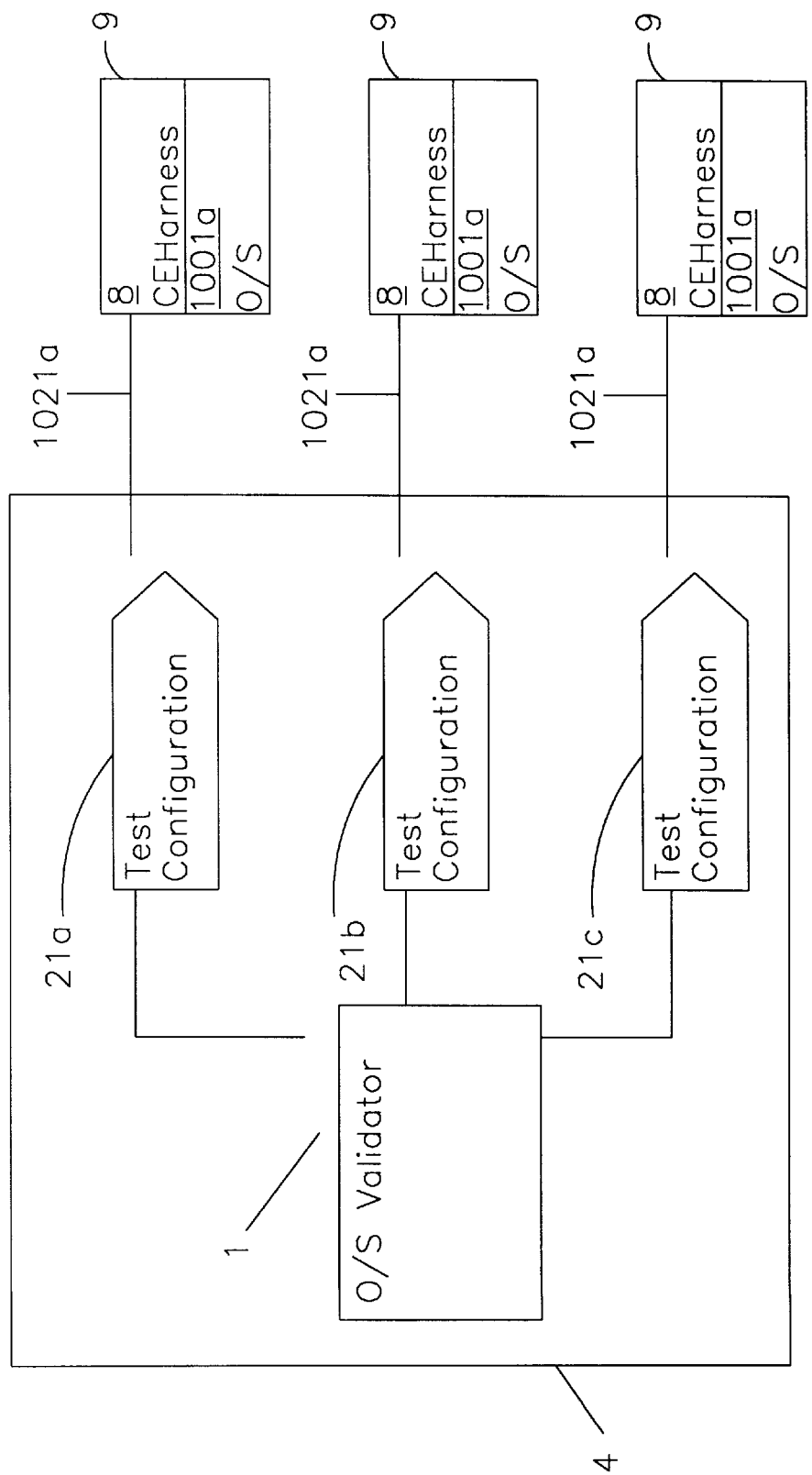
FIGURE 4.0

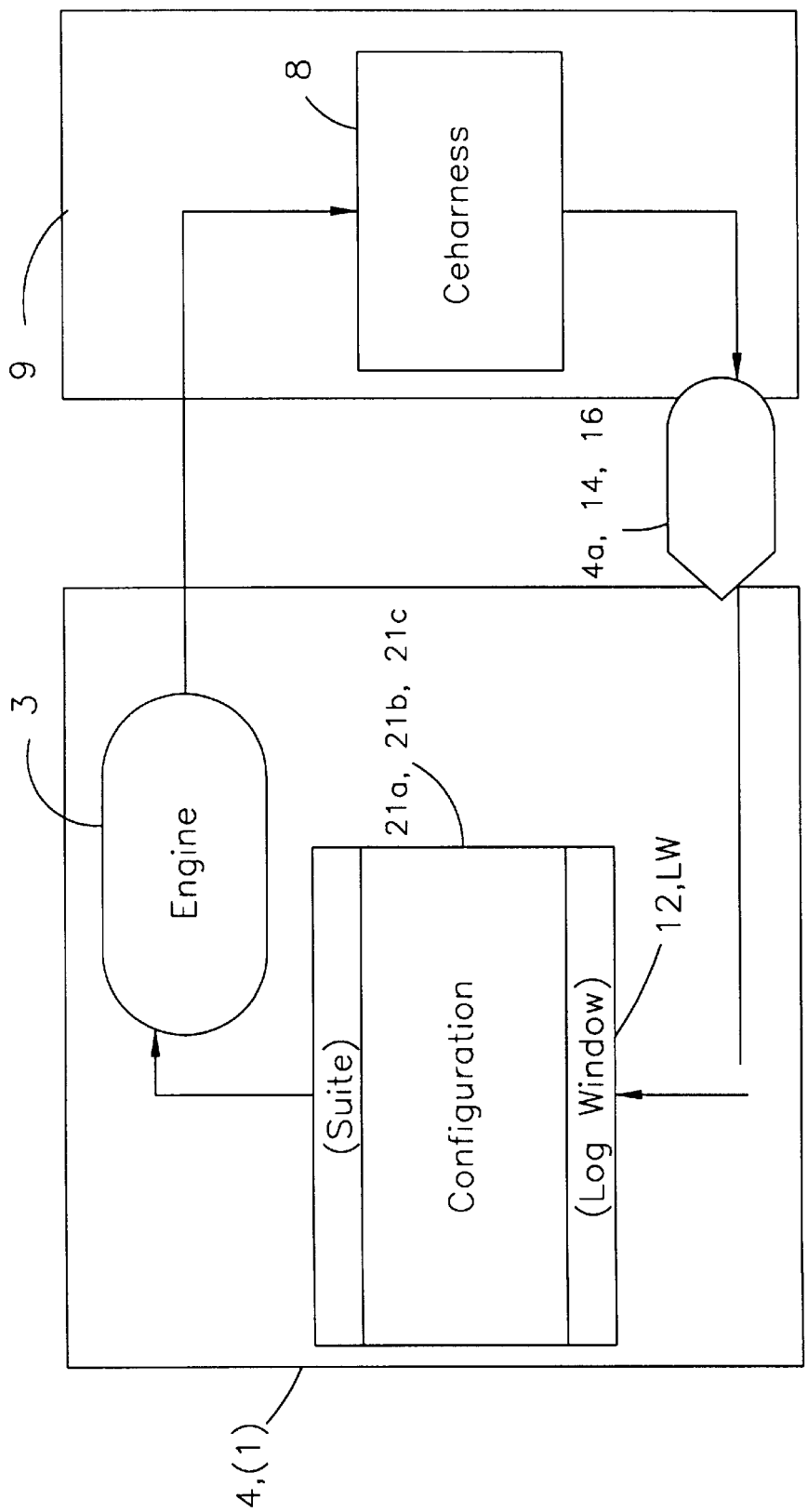
FIGURE 5.0

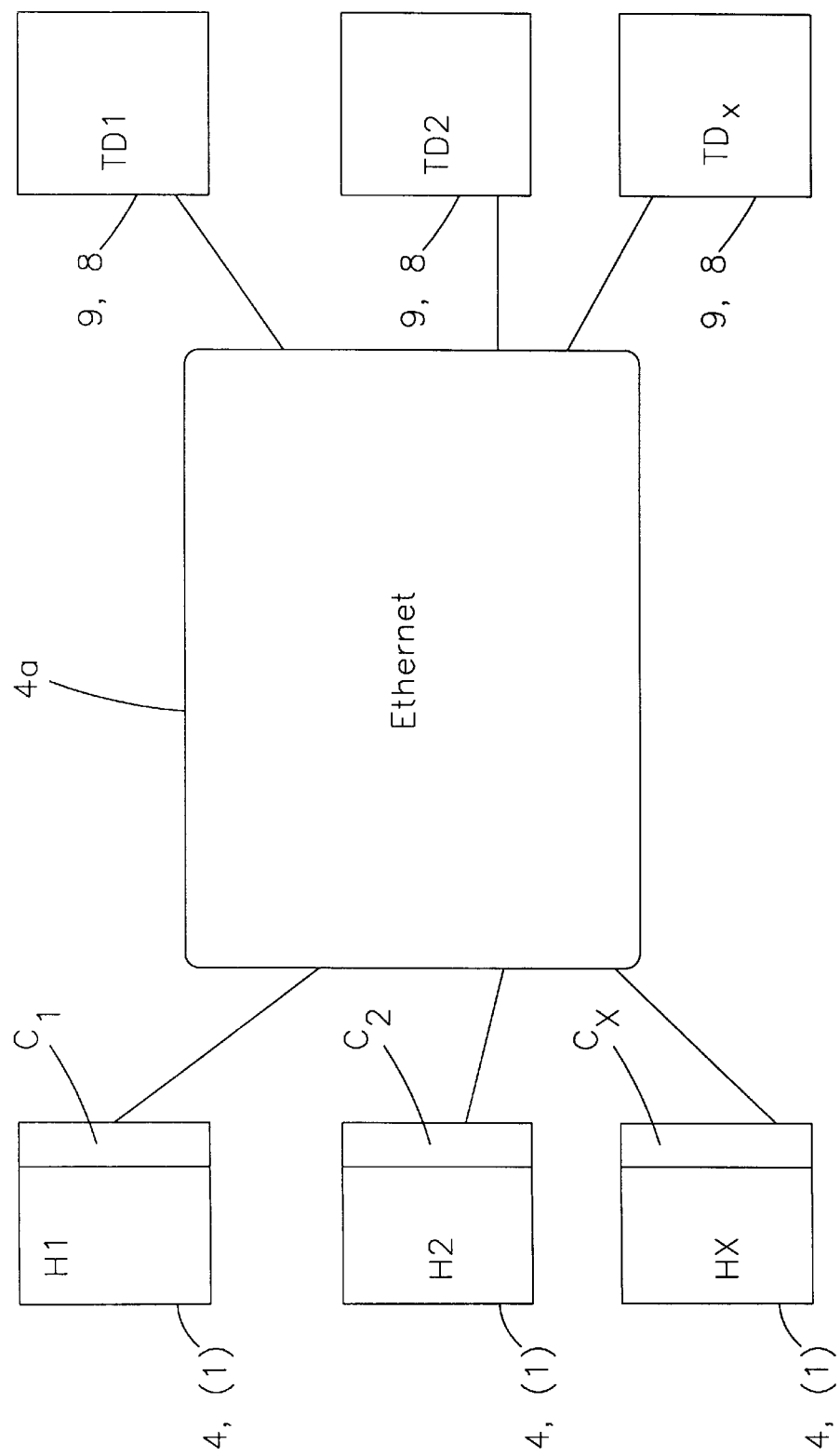
Figure 5.A

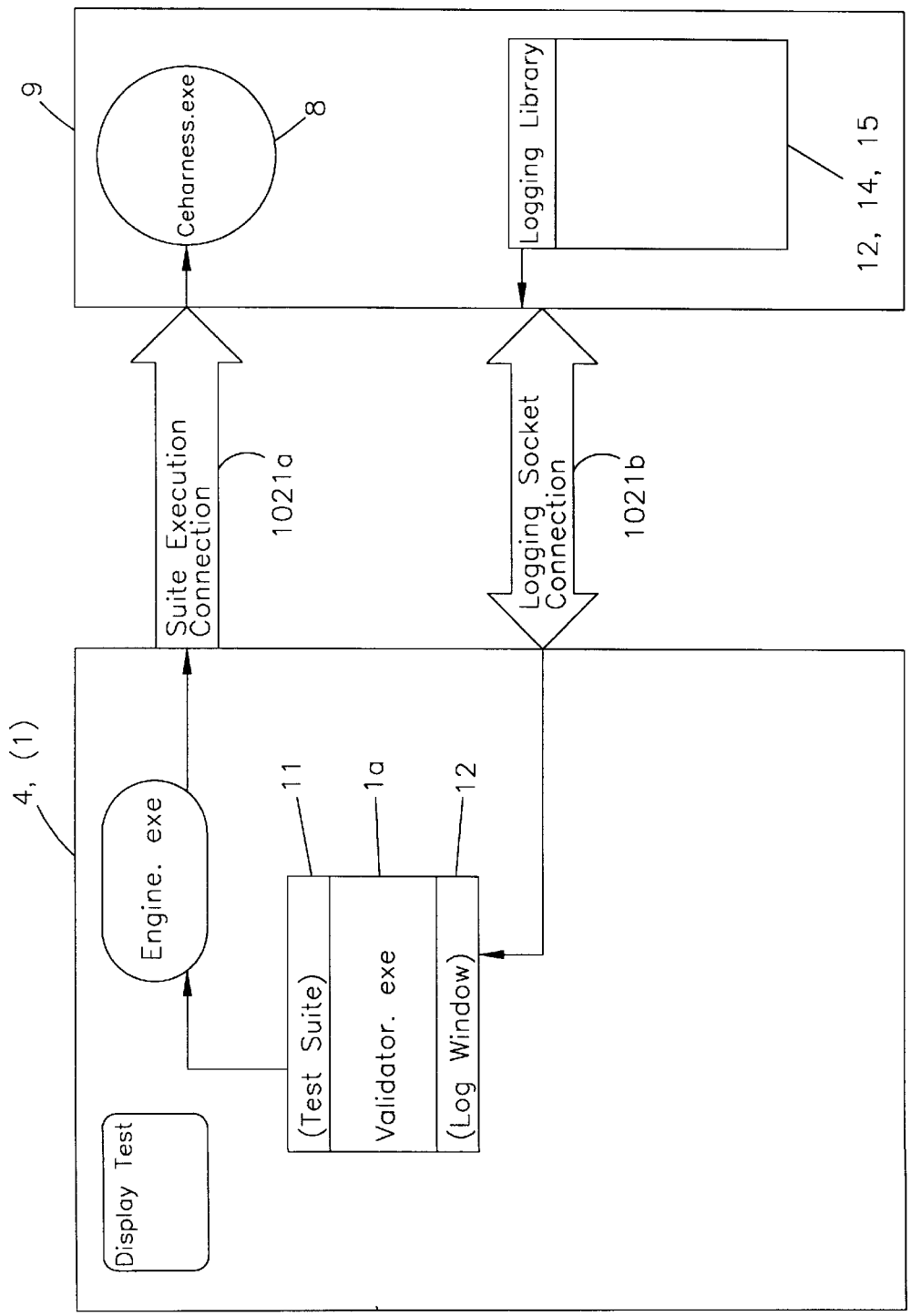
FIGURE 6.0

TABLE 1.0

| | |
|---|---|
| Automatic | Manual |
| Audio (WAV) | Audio (WAV) |
| Database | Display |
| Display | IrDA-COMM |
| Memory | IrDA-Sockets |
| OAL-Alarm | Keyboard |
| OAL-Time | PCMCIA-I O Card |
| OAL-I O control | PCMCIA-MemCard |
| OAL-TickCount | Power |
| ObjectStore-MainMemory | Printer |
| ObjectStore-StorageCard | ICMP |
| Serial Generic | Touchscreen/Cursor |
| Serial Hardware and Software FlowControl | |
| Serial Hardware FC | |
| Serial Software FC | |
| Serial None FC | |
| Socket | |
| TAPI | |
| TC Protocol | |
| UD Protocol | |

FIGURE 7.0

TABLE 2.0

AUTOMATIC

Audio
- closehandle
- readfile
- waveoutgetnumbers
- waveoutopen
- waveoutsetpitch
- createfile
- sleep
- waveoutgetpitch
- waveoutpause
- waveoutsetplaybackrate
- free
- waveoutclose
- waveoutgetplaybackrate
- waveoutpreapreheader
- waveoutsetvolume
- getfilesize
- waveoutgetdevcaps
- waveoutgetposition
- waveoutreset
- waveoutprepareheader
- playso
- waveo
- waveo
- waveo
- waveo Database
- cecreatedatabase
- ceopendatabase
- closehandle
- cedeletedatabase
- cereadrecordprops
- getlocaltime
- cedeleterecord
- ceseekdatabase
- memset
- cefindfirstdatabase
- cesetdatabaseinfo
- sleep
- ceoldg
- cewrit Display
- beginpaint
- createpenindirect
- deleteobject
- getclientrect
- loadcurser
- postquitmessage
- updatewindow
- bitblt
- createsolidbrush
- dispatchmessage
- getfilesize
- multibytetowidechar
- rectangle
- widechartomultibyte
- closehandle
- createwindow
- ellipse
- getsystemmetrics
- polygon
- roundrect
- createcompatibledc
- defwindowproc
- endpaint
- gettickcount
- polyline
- showwindow
- create
- delete
- free
- loadbi
- postm
- transl

FIGURE 8A

TABLE 2.0 (CONT.)

Memory
| closehandle | createfile | deletefile | formatmessage | getsto |
| globalmemorystatus | makelangid | sleep | virtualfree | writefi |

OAL
| closehandle | createevent | createthread | getlocaltime | getsys |
| gettickcount | kerneliocontrol | memcpy | setevent | setloc |
| setsystemtime | sleep | terminatethread | waitforsingleobject | |

ObjectStore
| closehandle | copyfile | createdirectory | createfile | delete |
| findclose | findfirstfile | findnextfile | free | getdis |
| getfileattributes | getfilesize | getstoreinformation | memset | movef |
| removedirectory | setfileattributes | writefile | | |

Serial
| checkcomargument | clearcommbreak | clearcommerror | closehandle | create |
| createthread | deviceiocontrol | free | getcommmask | getco |
| getcommproperties | getcommstate | getcommtimeouts | gettextcodethread | getsys |
| gettickcount | memset | purgecomm | readfile | setco |
| setcommmask | setcommstate | setcommtimeouts | setupcomm | sleep |

FIGURE 8A (CONT.)

TABLE 2.0 (CONT.)

| | | | | |
|---|---|---|---|---|
| Socket | waitcommevent | writefile | | | |
| | accept | address | bind | closehandle | closes |
| | connect | createthread | exitthread | free | htons |
| | ioctisocket | memset | recv | send | sleep |
| | socket | waitforsingleobject | wsacleanup | wsastartup | |
| TAPI | | | | | |
| | lineclose | linegetdevcaps | lineinitialze | linennegotiateapiversion | lineup |
| | lineshutdown | memset | | | |
| TCProtocal | | | | | |
| | accept | bind | closehandle | closesocket | create |
| | createwindow | defwindowproc | destroywindow | dispatchmessage | exitthr |
| | exttextout | getclientrect | getdc | htons | inet_n |
| | ioctisocket | killtimer | listen | makeword | memc |
| | memset | postquitmessage | recv | recvfrom | select |
| | send | sendmessage | sendto | settimer | show |
| | sleep | socket | translatemessage | updatewindow | waitfo |
| | wsacleanup | wsastartup | | | |
| UDProtocol | | | | | |
| | accept | bind | closehandle | closesocket | create |
| | createwindow | defwindowproc | destroywindow | dispatchmessage | exitthr |
| | exttextout | getclientrect | getdc | htons | inet_n |
| | ioctisocket | killtimer | listen | makeword | memc |
| | memset | postquitmessage | recv | recvfrom | select |
| | send | sendmessage | sendto | settimer | show |
| | sleep | socket | translatemessage | updatewindow | waitfr |
| | wsacleanup | wsastartup | | | |

FIGURE 8B

TABLE 2.0 (CONT.)

MANUAL

Audio

| | | | | |
|---|---|---|---|---|
| createfile | deletefile | free | memcpy | mems |
| printmmretcode | savewavefile | sleep | wavinaddbuffer | wavei |
| waveingetnumdevs | waveinopen | waveinprepareheader | waveinreset | wavei |
| waveinstop | waveinunprepareheader | waveoutclose | waveoutopen | waveo |
| waveoutunprepareheader | waveoutwrite | | | |

Display

| | | | | |
|---|---|---|---|---|
| beginpaint | bitbit | createcompatibledc | createdialog | create |
| createwindow | createwindowex | defwindowproc | deletedc | delete |
| destroywindow | dispatchmessage | drawtext | endpaint | getclie |
| getdc | getobject | getsystemmetrics | invalidaterect | |
| loadbitmap | loadcursor | polyline | postquitmessage | rectan |
| releasedc | rgb | selectobject | sendmessage | setbkc |
| setclasslong | setcursor | setcursorpos | settextcolor | setwin |
| showcursor | showwindow | updatewindow | | |

IrDA

FIGURE 8B

TABLE 2.0 (CONT.)

| accept | beginpaint | closehandle | closesocket | conne |
| createthread | createwindow | defwindowproc | destroywindow | dispat |
| endpaint | escapecommfunction | exttextout | flushfilebuffers | free |
| getclientrect | getcommtimeouts | getdc | getexitcodethread | getsoc |
| multibytetowidechar | postquitmessage | purgecomm | random | readfil |
| recv | send | sendmessage | setcommtimeouts | show |
| sleep | socket | terminatethread | translatemessage | updat |
| waitforsingleobject | writefile | | | |

Keyboard

| closehandle | createdialog | createfile | createwindow | create |
| defwindowproc | destroywindow | dispatchmessage | free | getclie |
| getdc | getfilesize | getmodulefilename | gettextmetrics | getwi |
| getwindowtext | hiword | initcommoncontrols | initinstance | killtim |
| loadcursor | makeintresource | memset | multibytetowidechar | postq |
| readfile | registerclass | releasedc | sendmessage | setfoc |
| setforegroundwindow | settimer | setwindowpos | setwindowtext | show |
| translatemessage | updatewindow | | | |

FIGURE 8C

TABLE 2.0 (CONT.)

PCMCIA

| | | | |
|---|---|---|---|
| carddeinit | cardgetfirsttuple | cardgetnexttuple | cardgetparsedtuple | cardg |
| cardinit | cardmapwindow | cardreleaseexclusive | cardreleaseirq | cardre |
| cardreleasewindow | cardrequestexclusive | cardrequestirq | cardrequestsocketmask | cardre |
| cardresetfunction | checkmemory | closehandle | createevent | create |
| deletefile | detectionfunction | deviceiocontrol | entercriticalsection | getsoc |
| initializecriticalsection | leavecriticalsection | loadlibrary | regclosekey | regcre |
| regdeletekey | regopenkeyex | regsetvalueex | setevent | sleep |
| waitforsingleobject | | | | |

Power

| | | |
|---|---|---|
| batterydrvrgetstatus | | getsystempowerstatusex |

Printer

| | | | |
|---|---|---|---|
| closehandle | createfile | memset | sleep | writefi |

Socket

| | | | |
|---|---|---|---|
| closehandle | creatfile | deletefile | getlocaltime | getsys |
| memset | winexec | writefile | | |

Tap/Cursor

| | | | |
|---|---|---|---|
| beginpaint | createwindow | defwindowproc | destroywindow | dispat |
| exttextout | fillrect | getclientrect | getdc | invalid |
| postquitmessage | retangle | releasecapture | releasedc | sendm |
| setcapture | setforegroundwindow | showwindow | translatemessage | updat |

FIGURE 8C (CONT.)

TABLE 3.0

| | |
|---|---|
| ClickMouse | IsGPFWindow |
| FindFocus | IsProcessDead |
| FindHandle | IsTopWindow |
| DBClickMouse | MoveMouse |
| Delay | PlayKeyboard |
| DragMouse | SetMonitorHandle |
| FindOSType | SetMonitorMode |
| FindTopHandle | SetPlaySpeed |
| GetFileCheckSum | SetScreenSaver |
| GetRandomNumber | ShowMessage |
| GetProcessHandle | StartProcess |
| GetWndCheckSum | StopProcess |

FIGURE 9.0

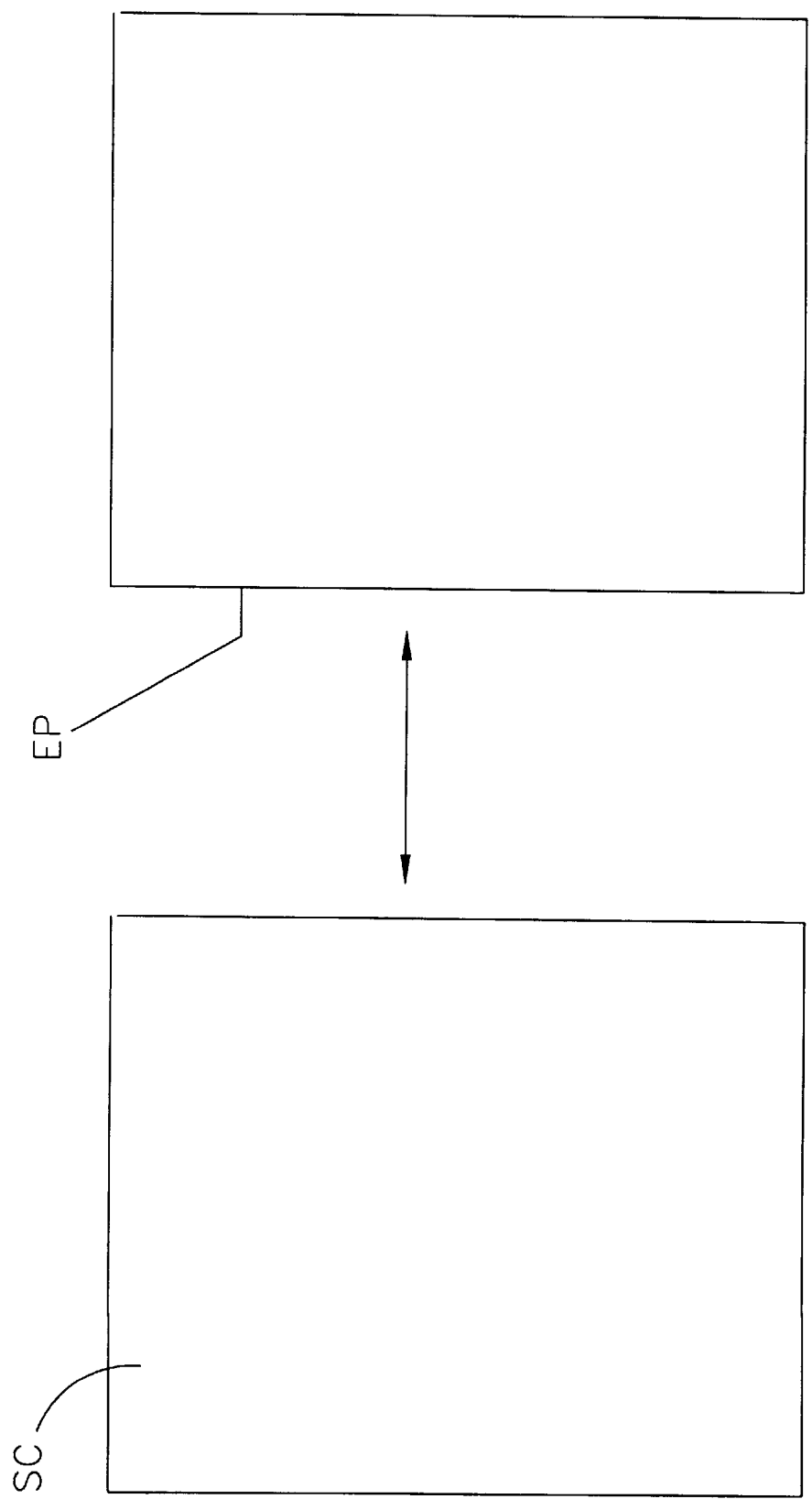
FIGURE 10.0

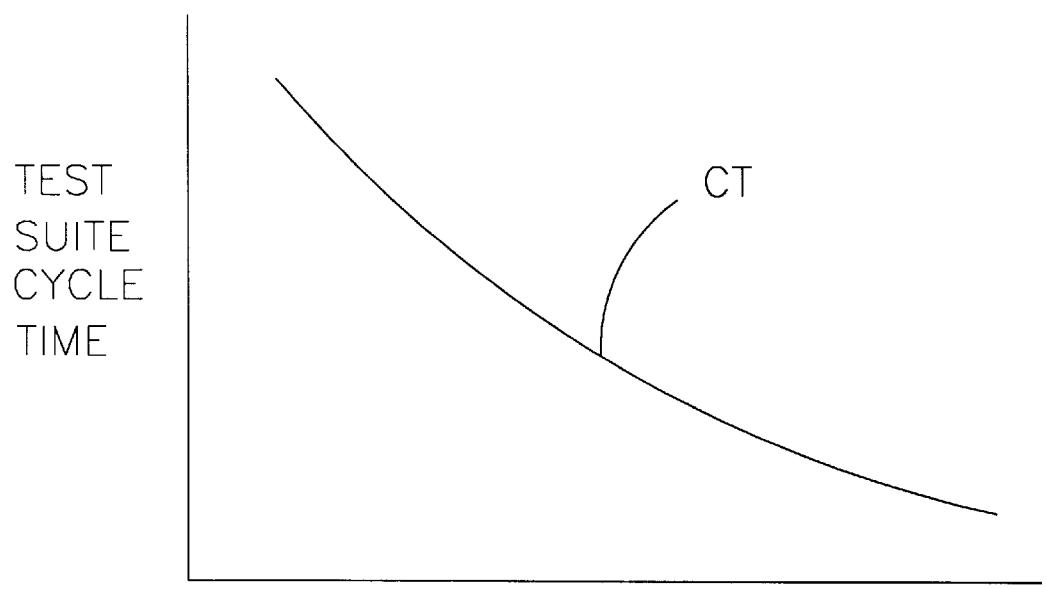
FIGURE 13.0
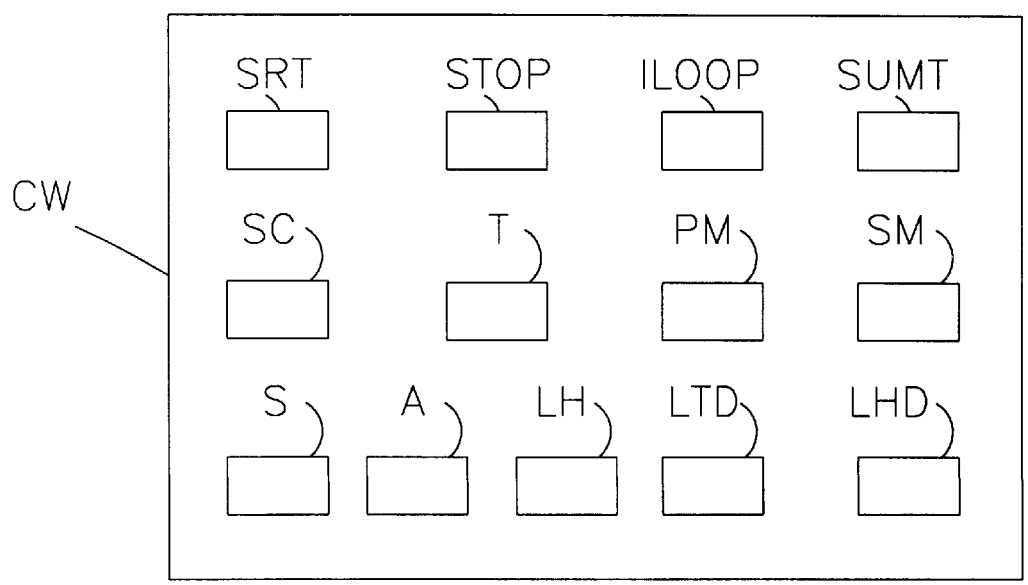
FIGURE 14.0

Testing Details

- OEM Adaptation Layer (OAL)-CE Validator tests are run for each of the OAL specific APIs and when possible the APIs are exercised by calling user level APIs.

| OAL Testing | | | |
|---|---|---|---|
| | GetClockTick | KarnellKOControl | |
| | OEMIOControl | OEMParallelPortGetByte | |
| | OEMWriteDebugString | SetKernelAlarm | |
| OEMClearDebugByte | OEMClearDebugCommError | OEMGetRealTime | |
| OEMReadDebugByte | OEMSetAlarmTime | OEMReadDebugByte | |
| OEMSetRealTime | | | |

- PCMCIA-CE Validator provides a comprehensive set of tests for one of the most difficult sub-systems areas. The test validate functions for both card and socket services.

| PCMCIATesting | Card Service Functions tested | | | |
|---|---|---|---|---|
| | CardAccessConfigurationRegister | CardDeregisterClient | CardGetEventMask | |
| | CardGetParsedTuple | CardGetStatus | CardGetTupleData | |
| | CardRegisterClient | CardReleaseConfiguration | CardReleaseExclusive | |
| | CardReleaseWindow | CardRequestConfiguration | CardRequestExclusive | |
| | CardRequestWindow | CardResetFunction | CardSetEventMask | |
| | Socket Services calls tested buy the Card Service Functions | | | |
| | PDCardGetWindow | PDCardInquireAdapter | PDCardInquireWindow | |
| | PDCardReadIOByte | PDCardResetSocket | PDCardSetAdapter | |
| | PDCardWriteAttrByte | PDCardWriteCmnByte | PDCardWriteIOByte | |
| | | CardGetFirstTuple | CardGetNextTuple | |
| | | CardMapWindow | CardModifyWindow | |
| | | CardReleaseIRQ | CardReleaseSocketMask | |
| | | CardRequestIRQ | CardRequestSocketMask | |
| | | PDCardGetAdapter | PDCardGetSocket | |
| | | PDCardReadAttrByte | PDCardReadCmnByte | |
| | | PDCardSetSocket | PDCardSetWindow | |
| | | PDCardGetAdapter | PDCardGetSocket | |

TABLE 4.0
FIGURE 15A

- Ethernet-CE Validator test Ethernet through Sockets (WinSock). The functionality of TCP and UDP, are tested using the APIs included in the matrix which includes, both client and server and can run either DHCP or Static IP network settings.

| Ethernet Testing | API in Client Side : | | | | |
|---|---|---|---|---|---|
| | WSA Startup | Gethostbyname | Inet_addr | Gethostbyaddr | Socket |
| | Connect | Send | Recv | Close ssocket | WSA Cleanup |
| | API in Server Side: | | | | |
| | WSA Startup | Socket | Gethostbyname | Connect | Close ssocket |
| | WSACleanup | Recv | Send | Bind | Listen |
| | Accept | | | | |

TABLE 4.0

FIGURE 15A (CONT.)

TABLE 4.0 (CONT.)

- Infrared (IrDA)-CE Validator test infrared ports using two methods of communications IRSock and IRCom. IRSock uses essentially the same interfaces as the Ethernet subsystem. Instead of the sockets transferring and receiving data through Ethernet, it uses wireless Infrared. IrSock test include a client and server testing. IrCom uses essentially the same interfaces as the Serial subsystem. Instead of a serial port tranferring data over a cable, it uses wireless Infrared.

| IrD A-IR Sock Testing | API in Client Side | | | | |
|---|---|---|---|---|---|
| | Socket | Getsockopt | Connect | Send | Recv |
| | Closesocket | | | | |
| | APIinServerSide: | | | | |
| | Socket | Bind | Listen | Accept | Recv |
| | Send | Closesocket | | | |
| IrD A-IR Com Testing | CreateFile | GetCommState | SetCommState | WriteFile | ReadFile |
| | CloseHandle | GetCommMask | SetCommMask | GetCommModemStatus | SetCommBreak |
| | ClearCommBreak | GetCommTimeouts | SetCommTimeouts | GetCommProperties | TransmitCommChar |
| | ClearCommError | DeviceIOControl | SetupComm | WaitCommEvent | |

FIGURE 15B

- Touch panel and/or Mouse testing–CE Validator uses a combination of test routines with human interaction to verify taps and double taps.

| Touch Panel and/or Mouse Testing | ErroeAnalysis | TouchPanelCalibrateAPoint |
|---|---|---|
| | TouchPanelGetDeviceCaps | TouchPanelPowerHandler |
| | TouchPanelSetMode | |
| TouchPanelDisable | TouchPanelD11Entry | TouchPanelEnable |
| TouchPanelReadCalibrationAbort | TouchPanelReadCalibrationPoint | TouchPanelSetCalibration |

- Keyboard–CE Validator runs tests to confirm the keyboard functions.

| Ethenet Testing | GetKeyState() | |
|---|---|---|

TABLE 4.0 (CONT.)

FIGURE 15B (CONT.)

TABLE 4.0

- File Systems – CE Validator tests both tranitional file systems and CE's specialized object store classes are tested. run either DHCP or Static IP network settings.

| File System Testing | File System Testing | | | | | |
|---|---|---|---|---|---|---|
| | Create File | WriteFile | Copyfile | FindFirstFile | FindNextFile | |
| | Find Close | DeleteFile | CloseHandle | MoveFile | CreateDirectory | |
| | Delete Directory | | | | | |
| | CE Database Test: | | | | | |
| | CeCreate Database | CeOldGetInfo | CeSetDatabaseInfo | CeDeleteDatabase | CeFindFirstDatabase | |
| | CeOpen Database | CeWrite RecordProps | CeSeekDatabase | CeReadRecordProps | CeFindNextDatabase | |
| | CeDelete Record | | | | | |

- Memory – CE Validator runs tests to confirm that the memory sub-system works correctly.

| Memory Testing | GetStoreInformation | Createfile | Writefile | DataFile | GlobelMemoryStatus |
|---|---|---|---|---|---|
| | VirtualAlloc | Free | VirtualFree | | |

FIGURE 15C

TABLE 4.0 (CONT.)

- Serial Port – CE Validator suites provide in depth testing for both client and server software.

| Serial Port Testing | Serial Test DDI(s) | | | | |
|---|---|---|---|---|---|
| | SL_Init | SL_DeInit | SL_Open | SL_Close | SL_ClearDTR |
| | SL_SetDTR | SL_CleanRTS | SL_SetRTS | SL_ClearBreak | SL_SetBreak |
| | SL_SetBaudRate | SL_ByteSize | SL_SetParity | SL_SetStopBits | SL_GetRxBufferSize |
| | SL_GetAxStart | SL_GetInterruptType | SL_RxIntr | SL_PutBytes | SL_TxIntr |
| | SL_LineIntr | SL_OtherIntr | SL_GetStatus | SL_Reset | SL_GetModemStatus |
| | SL_PurgeComm | SL_XmitComChar | SL_PowerOff | SL_PowerOn | SL_SetDCB |
| | SL_SetCommTimeouts | SL_Ioctl | SL_GetCommProperties | GetSerialObject | |
| Access Functions using API(s) | | | | | |
| | GetCommState | SetCommState | | WriteFile | ReadFile | CloseHandle |
| | GetCommMask | SetCommMask | | GetCommModemStatus | SetCommBreak | ClearCommBreak |
| | GetCommTimeouts | SetCommTimeouts | | GetCommProperties | TransmitCommChar | ClearCommError |
| | DeviceIOControl | SetupComm | | WaitCommEvent | CreateFile | |

FIGURE 15C (CONT.)

PROTOCOL ACKNOWLEDGMENT BETWEEN HOMOGENEOUS SYSTEM

CROSS-REFERENCE TO RELATED APPLICATIONS

This patent application claims the benefit of U.S. Provisional Patent Application Ser. No. 60/137,629, entitled "PROTOCOL ACKNOWLEDGEMENT BETWEEN HOMOGENEOUS SYSTEMS," filed Jun. 4, 1999, and is a continuation-in-part of related U.S. Patent Application Ser. No. 09/489,308, entitled "CE VALIDATOR TEST SUITE," filed Jan. 21, 2000, which claims benefit of U.S. Provisional Patent Application Ser. No. 60/116,824, entitled "CE VALIDATOR TEST SUITE," filed Jan. 21, 1999.

TECHNICAL FIELD

This invention relates to product quality assurance and to test systems and methods for validating operating systems provided in computerized products. More particularly, the present invention relates to product quality assurance and to test systems and methods for validating an operating systems during the development of computerized products. Even more particularly, the present invention relates to product quality assurance and to test systems and methods for validating operating systems, such as Windows CE, manufactured and sold by Microsoft, Incorporated of Redmond, WA, typically provided in computerized products.

BACKGROUND OF THE INVENTION

Increasingly, developers are embedding operating systems, such as Windows CE, into many different types of computerized products, including set-top boxes, gaming systems, bar-code scanners, and factory automation systems. As Windows CE has grown, so too has the need for "off-the-shelf" software development tools. Although many tools and "off-the-shelf" software kits have been on the market for saving device design time, leading to speedy device development, no fast testing system or method existed to verify compatibility of these new products, especially at the final stages of device development.

Traditionally, only two operating system device testing options have been available: (1) in-house writing of the test code, or (2) out-sourcing the custom code development to another firm. To complete the testing project in-house, Original Equipment Manufacturers (OEMs) must spend months training their staff, more months developing the test codes, and yet even more months of preparation before their product can be tested using such codes. Likewise, an outsource custom code development house would spend months writing the code. Thus, both options are time-consuming and, therefore, costly.

In related art quality assurance device testing systems, several network protocols are used which suspend program execution while waiting for an acknowledgment of a sent message. For example, Transmission Control Protocol (TCP), at a low level, blocks program execution until certain sent messages are acknowledged by the remote end of a "connection." Most protocols are implemented in an O/S-independent manner. As such, sent messages requiring an acknowledgment must be maintained in a list which cross-references the identification of a sent message with an execution thread, such thread waiting for such acknowledgment. Such related art systems follow a lengthy sequence: creating a message ID prior to sending the initial message; adding an element in a list associating the execution thread with the message ID; sending the message; blocking the sending thread of the execution until the receiving code unblocks it; acknowledging, by the remote process, the sent message by sending back an ACK message containing the original message ID; receiving ACK message by the sending machine; parsing for the message ID of the originally sent message; looking-up the message ID in the list; determining which execution thread to release from the list; and finally, releasing the original sending thread of execution to continue program execution.

These time consuming operating system device testing options have created a long-felt need for a consolidated testing system and method, utilizing a protocol acknowledgment between homogeneous systems, for improving product quality, imparting time and cost savings of many person-months, and streamlining of the product development process. In particular, a system and method for testing and validating devices having an embedded Windows CE operating system installed is needed to overcome the foregoing problem and thus provide a system and method which improves product quality, imparts time and cost savings of many person-months, and streamlines the product development process resulting in a fully automated design verification package for device designers. In particular, a need exists for a system which uses O/S-provided events, an O/S-internally-maintained event list, and an O/S-internally-maintained blocking threads (i.e. sending threads) list. Thus, unlike related art protocol acknowledgment methods, several steps need to be eliminated (e.g., adding an element which associates the execution thread with the message ID in a list, cross-referencing the message ID in a list, and determining which execution thread to release from a list entry).

Thus, a code which is simpler, shorter, and less error-prone via an alternative method of processing ACKs would be beneficial where a plurality of actions could be executed upon reception of an acknowledgment message (e.g., multiple cross-referencing and attendant delays elimination, code for the reception of ACK which is largely identical with a single-thread case, priority data which need not be maintained in a sent message list if multiple threads are prioritized, and an ID list which need not be entirely scanned to determine a thread-release priority as an O/S restarts all threads with an appropriate priority). A beneficial system would also be able to implement multiple pending threads of execution which are waiting for an ACK message, the threads needing merely to use the O/S-provided function of waiting for an event handle which was embedded by the initial "send" in the protocol header. Likewise advantageous, multiple threads of execution should be triggered, without additional cross-reference processing, by an ACK for any message of a plurality of sent messages.

BRIEF SUMMARY OF THE INVENTION

Accordingly, the present invention, to be commercially available under applicant's assignee's trademark of CEValidator™, is an operating system validator, (herein also referred to as O/S Validator, and designated in the Figures with the numeral "1," which solves the foregoing problems by providing a test system encompassing an automated test suite method for testing a port of an operating system, such as Windows CE, in a target device's hardware and/or software being newly developed. The O/S Validator comprises a comprehensive code base, specifically developed to purposefully stress the O/S, device driver, OEM Adaptation Layer (OAL), and hardware interaction through the use of a unique contemporaneous multithreaded execution methodology for acknowledging protocol between homogeneous systems. The provided test suites focus on identifying three primary defects: hardware design, hardware programming (drivers/OAL), and operating system interaction. Special diagnostic emphasis is placed on Windows CE subsystems which have historically shown the most problems. The test suites comprise nearly 1500 tests which include system stress-testing routines, as well as feature-and-function tests, providing a complete analysis of a Windows CE port. These tests are grouped by the O/S Validator. The O/S Validator includes both test source codes and executable programs for all tests.

To simplify execution of test suites and collection of logging results, an intuitive user interface for the O/S Validator host component, such as a standard Windows application leveraging the Microsoft Windows user interface, is utilized. The O/S Validator distributes test suites as a client/server application. A graphical user interface (GUI) interacts with a small application, CEHarness.exe, which is running on a target device. Because this communication may occur over Ethernet, at least one host may run suites against at least one target device.

The O/S Validator generates useful error information when a target device fails a test. While the suites are running, results are displayed in a plurality of dynamically created log windows as well as in a configuration's summary tab. The logging windows contain the full text of a given test's results. Failures are color-coded red to ease identification. Navigation buttons in the logging window allow the user to quickly move from one failure to another. The logging APIs in the tests also cause a prolog and an epilog to be generated in each result file. Information such as concurrently running processes, battery power level, and execution date and time is automatically recorded in the results file and displayed in the log window. Useful summary information such as loss of program memory, loss of storage memory, or total test execution time is provided in a log window tab. The summary information for a given test result is also collected and displayed in a Summary tab of the configuration window. The summary tab reports the number of PASS and FAIL test cases in real time. Breakout PASS and FAIL numbers for individual suites are also displayed. The configuration window's Summary tab facilitates quick navigation to an individual failure among perhaps thousands of test results. The exact source file and line number corresponding to a logged failure are automatically reported by the O/S Validator's logging APIs. Since O/S Validator provides the source code for all of its executables, being able to go directly to the source code reporting an error is a powerful adjunct to the textural descriptions of the failure.

The present invention uses an O/S-generated event handle as a member field of a protocol, releasing an execution thread which is waiting for an acknowledgment (ACK) message. A O/S-generated event handle such as a WIN32 event handle, used for blocking an original send thread of execution, is placed in a header and sent back in the ACK. A receiving thread does not require the looking-up of a transaction identification (ID) in a list. Instead, the receiving thread unblocks any threads waiting for the event. In other words, the present invention uses the O/S-provided events, the O/S-internally-maintained event list, and the O/S-internally-maintained list of blocking threads (i.e. sending threads). Thus, unlike related art protocol acknowledgment methods, several steps are eliminated: adding an element which associates the execution thread with the message ID in a list, looking-up the message ID in a list, and determining which execution thread to release from a list entry.

Consequently, the code is simpler, shorter, and less error-prone via the instant invention's alternative method of processing ACKs. Thus, the present invention offers many advantages in expediting a plurality of actions upon the reception of an acknowledgment message: multiple cross-referencing and attendant delays are eliminated, code for the reception of ACK is largely identical with the single-thread case, priority data need not be maintained in a sent message list if the multiple threads are prioritized, and the ID list need not be entirely scanned to determine the thread-release priority as the O/S restarts all threads with the appropriate priority. To implement multiple pending threads of execution which are waiting for an ACK message, the threads need merely use the O/S-provided function of waiting for an event handle which was embedded by the initial "send" in the protocol header. Similarly, multiple threads of execution may be triggered, without additional cross-reference processing, by an ACK for any of a plurality of sent messages.

Other features of the present invention are disclosed or are apparent in the section entitled, "DETAILED DESCRIPTION OF THE INVENTION."

BRIEF DESCRIPTION OF DRAWINGS

For a better understanding of the present invention, reference is made to the below referenced accompanying drawings.

FIG. 1.0 is a schematic diagram representative of a computerized product presently being provided with an embedded operating system in a control unit.

FIG. 2.0 is a manufacturing flow diagram illustrating quality assurance testing on a computerized product provided with an embedded operating system, in accordance with the present invention.

FIG. 3.0 is a block diagram showing the primary components of the operating system validator of the present invention, including a graphical user interface, an engine, a plurality of test suites, and a logging library, in accordance with the present invention.

FIG. 4.0 is a block diagram showing the execution of a plurality of test suite configurations from a host device for testing a plurality of target devices provided with an embedded operating system, in accordance with the present invention.

FIG. 5.0 is a block diagram showing the present invention essentially as depicted in FIG. 4.0 except showing communication by the target device with the O/S Validator 1 at the host via Ethernet means.

FIG. 5.A illustrates an arrangement where communications between a plurality of host and target devices may occur over Ethernet, in accordance with the present invention.

FIG. 6.0 shows yet another arrangement for a test suite execution situation, in accordance with the present invention.

FIG. 7.0 is a table listing of functional areas of specific APIs tested in automatic and manual test suite execution, in accordance with the present invention.

FIGS. 8A, 8B, and 8C, together, comprise a comprehensive table listing of functional areas and their respective APIs which may be tested in automatic or manual mode, in accordance with the present invention.

FIG. 9.0 is a table listing of selected APIs for use in building automation scripts, in accordance with the present invention.

FIG. 10.0 is a schematic diagram representative of the concept of the present invention providing source code for all executable programs, in accordance with the present invention.

FIG. 13.0 illustrates, in graph form, the test cycle time as a function of the number of test devices being concurrently tested, in accordance with the present invention.

FIG. 14.0 is a block diagram representation of a configuration window showing tabs for executing a variety of configuration related functions, in accordance with the present invention.

FIGS. 15A, 15B, and 15C, together, comprise a table listing testing details of the operating system components, in accordance with the present invention.

DETAILED DESCRIPTION OF THE INVENTION

Figure 11:
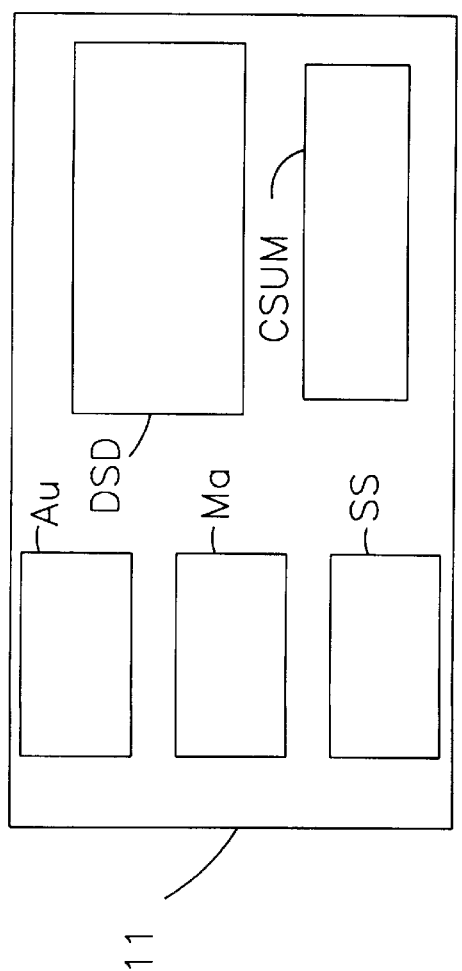
FIG. 11.0 is a block diagram representation of a window showing the test suites selection options as well as other related summary functions, in accordance with the present invention.

FIG. 1.0 shows a computerized product 1000, (9), typical of computerized products such as computer workstations, set-top boxes, gaming systems, bar-code scanners, and factory automation systems presently being provided with an embedded operating system, depicted by the numeral 1001a. As illustrated, and as described herein, product 1000 may comprise a typical target device 9 provided with an operating system 1001a, such as an embedded Windows CE operating system (O/S). The computerized product 1000 may function as a standalone device, having an installation of the present invention, the O/S Validator 1, for testing and validating its own operating system 1001a. The standalone testing facilitates new test development and de-bugging of reported defects as elaborate knowledge of O/S Validator infrastructure is not necessitated. However, in a more likely application, as shown in FIG. 2.0, product 1000 may function, in a manufacturing quality assurance testing environment M, as a host computer 4 having an installation of the present invention, the O/S Validator 1 for testing a target devices 9, and being provided with an operating system 1001a. Referring back to FIG. 1.0, a computerized product 1000 may comprise, by example, several sub-components, including a control unit 1020, including a plurality of input/output ports 1021, a keyboard 1009, a printer 1010, a mouse 1011, and a monitor 1012. The sub-components 1009, 1010, 1011, and 1012, themselves, may be testable target devices. The typical control unit 1020, itself, comprises several sub-components, including a central processing unit 1001, storage devices such as a hard disk drive 1004, other memory components including RAM, 1002, a ROM 1003, a compact disc 1005, an audio component 1006, a network/server card 1007, and a modem 1008. Necessarily included in the control unit, is an operating system 1001a, to make product 1000 functional as a useful device.

FIG. 3.0 shows the primary components of the O/S Validator 1 including a graphical user interface (GUI) 2, an Engine 3, a plurality of Test Suites 11, and a Logging Library 12. The GUI 2 and the Engine 3 communicate internally, in both directions, through a component called HarnessLink.dll, designated by the numeral 7 within O/S Validator 1 and discussed below in more detail. FIG. 4.0 illustrates a host computer 4 provided with O/S Validator 1. As illustrated, a plurality of target devices 9, are provided with an O/S 1001a for being tested in accordance with the present invention. The O/S Validator 1 has capabilities of generating testing configurations, such as a plurality of test configurations 21a, 21b, and 21c, for testing a particular function under control of OS 1001a within target devices 9. A device side component, termed CEHarness 8 communicates with Engine 3 in O/S Validator 1. As depicted in FIGS. 5 and 5a, CEHarness 8 may also communicate with Engine 3 in O/S Validator 1 via Ethernet means 4a. FIG. 5a illustrates, that because communication may occur over Ethernet, a plurality of hosts 4 may run suites against a plurality of target devices 9. In yet another alternative, and as depicted in FIG. 6 for a test suite execution situation, CEHarness 8 may also communicate with Engine 3 in O/S Validator 1 via suite execution connection 1021a, where host computer 4 may comprise a NT host computer, where the logging library 12 is also provided in a target device 9, and where the test results are provided to host computer 4 via socket connections 1021b.

In operation, the O/S Validator 1 tests and validates target devices 9 provided with an embedded operating system, by example a Windows CE Operating System. Broadly stated, the O/S Validator 1 functions by (1) validating the Windows CE port to a target device, (2) providing stress and performance testing, (3) logging and analyzing results, (4) testing a plurality of functional areas, including a plurality of applications program interfaces (APIs), (See Table 1.0 and Table 2.0 in FIGS. 7, 8A, 8B, and 8C, respectively), (5) executing a plurality of pass/fail tests in a plurality of test suites, (6) facilitating customization of tests in the automated suites, (7) providing a host side graphical test harness, (8) stressing and evaluating memory performance, (9) providing means for building test automation, including a plurality of APIs, (See Table 3.0 in FIG. 9.0), and (10) providing a results analysis tool termed CEAnalyzer. As previously stated, and as depicted in FIG. 10, O/S Validator 1 includes, for all tests, both test source codes SC and executable programs EP (also referred to as test executable). The sole implementation requirement for a test executable EP is that test case "passes" and "failures" be reported using two specific APIs: WRITETESTPASS ( ) and WRITETEST-FAIL ( ). These macros have signatures similar to the well-known prints ( ) function, but their use generates a standard test case result format in the "results" file amenable to automated summarization and integrates the reporting with the host user interface. The O/S Validator 1 method further comprises mediating between the GUI 2 and the test cases encapsulated in the test executables EP and providing a means by which the GUI 2 distributes and coordinates the execution of tests. The test suites 11 comprise text files 5 composed of suite language commands (e.g. PUT, RUN, WAIT, and DELETE) which are the direct expressions of the tasks needed to distribute and execute the test. Other supported suite commands are GET for retrieving a file from a target device 9, RUNHOST for running an executable program EP on the host computer 4 which is useful for client/server style tests, WAITHOST for waiting for the termination of a process on the host computer 4, which is also useful for client/server style tests, PUTSYSTEM for putting a file in the device's system directory (/Windows), SLEEP for basic timing when all else fails, MSGBOX for displaying a message box on the host machine, SETREG for adding or changing a registry setting on the device, and DELREG for removing a registry setting from the device. Initial suite file comments, in addition to providing internal suite documentation, are presented as the suite descriptions in GUI 2. The O/S Validator 1 method includes organizing the test suite files 5 by their hierarchical placement within a directory structure on the host computer 4. As shown in FIG. 11, test suites 11 are divided at the top level as being either automatic test suites (Au), manual test suites (Ma), or stress test suites (SS). Automatic suites Au are tests which do not require any user intervention during their execution. In contrast, manual suites Ma do require user intervention (e.g. keyboard and touch panel suites). The O/S Validator 1 method includes stressing the system, through the stress suites SS by pressing input/output (I/O) throughput to the limit, operating with little or no available program or object store memory, and possibly bringing down a custom file system with multi-threaded concurrent stressing. Below this top level of hierarchy, the O/S Validator 1 method includes arranging the test suites 11 by the functional areas (See generally FIG. 7).

Figure 12:
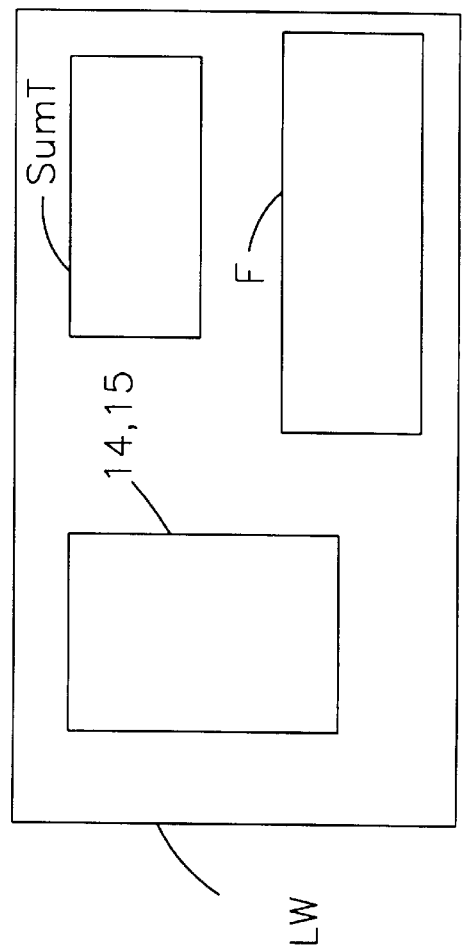
FIG. 12.0 is a block diagram representation of a logging window showing tabs for test results, test failures, and related test summary options, in accordance with the present invention.

As notes above, FIG. 3.0 shows the primary components of the O/S Validator 1 including a graphical user interface (GUI) 2, an Engine 3, a plurality of Test Suites 11, and a Logging Library 12. O/S Validator 1 utilizes GUI 2 as a Visual Basic component since it works well for any level of user. The GUI 2 design is based on the concept of interfacing the user input with underlying components. The Engine 3 holds the core of the functionality on the host 4. The Engine 3 reads a plurality of suite files 5, parses them, and executes the commnands. The Engine 3 obtains the information from the GUI 2 and uses the information to set-up a variety of execution options. The Engine 3 is written in C/C++ language. The Engine 3 is linked to the GUI 2 via a component termed HarnessLink.dll 7, which is an ActiveX control. HarnessLink.dll 7 is instantiated and called from the GUI 2 by a variety of information, which is passed to the Engine 3 before it begins to execute. Dli link 7 also functions to communicate between the Engine 3 and the GUI 2 during the execution, to relay information, error messages, and some dynamic run-time commands. The target device 9 comprises a device-side (as opposed to a host-side) component called CEHarness 8. CEHarness 8 is a C/C++program residing on the target device 9 and, as shown in FIG. 4, communicates nearly exclusively with the Engine 3, unless broadcasting target information on the network, with the GUI 2 receiving such information and passing it to the Engine 3 (See FIGS. 5 and 5a). CEHarness 8 is an event-driven application, where the Engine 3 sends the events and CEHarness 8 responds. The two remaining components, test suites 11 and logging library 12, are intertwined since the test suites 11 are written using a plurality of application program interfaces (APIs) 13 that are part of the logging library 12 (See FIGS. 8A, 8B, and 8C). These APIs 13 have substantial functionality and are somewhat dependent on the information passed through the component chain. The logging library 12 has a simple functionality concept, communicating the test results 14 by creating log files 15 by either logging TCP/IP information 16 back to the GUI 2 (See FIG. 5.0) or by writing results 14 and log files 15 directly to the device 9 (See FIG. 6.0). As depicted in FIG. 12, a logging window LW shows the test results 14 in test files 15, failures F and a summary tab SumT which facilitates user-access to program memory, passes, failures, and timing information. The plurality of test suites tests 11 comprise the indispensable component of the O/S Validator 1. FIG. 13 illustrates in graph form that the test cycle time CT decreases as the number of test devices are concurrently tested.

In further detail, the GUI 2 is a complex code due to its degree of functionality required for handling its layer of components. The GUI 2 provides a "wizard" whose primary function is walking new users through the various selectable settings and listing the default settings. As shown in FIG. 14, GUI 2 also provides a configuration window CW, as the means for executing a test run which comprises a single pass through a set of selected suites 11 on a target device 9. As shown in FIG. 4, a plurality of configurations 21a, 21b, and 21c may be run to simulate a variety of scenarios. The contents of a configuration window CW comprises a plurality of tabs for user control. By example, suite tab S provides a tree view of suite files directory under the O/S Validator directory. This tree view is organized to provide meaningful distinctions between the types of tests 1 the user selects. Additionally, this tree view is created as the user opens the configuration window CW, allowing the user to extend the O/S Validator 1 by adding new user-input suites to the suite file directory created by the O/S Validator 1 installation program. Test suites 11 are scripts of commands that the Engine 3 reads and then performs actions corresponding to such scripts of commands. The suite files 5 are generally started with a series of comments. These comments appear in the suite file information section of the file. If the word "Manual" appears at the stop of a suite file 5, the file is deemed to require manual execution and is, therefore, assigned a different icon. In the test suite section, as illustrated in FIG. 11, the user may reorder the test suite files 5 in any way. Still referring to FIG. 14, the logging tabs contains considerable valuable information. The user may select three methods of logging, namely LH for logging to the host 4, LTD for logging to the target device 9, or LHD for logging to both host 4 and target device 9. The log information is then stored in a configurable directory listed in an edit box. All this information is sent through the DLL 7 to the Engine 3 and then to CEHarness 8 in target device 9. Subsequently, the information is acquired by the logging library 12 upon running a test 11. Other tabs in the configuration window CW include a set stress condition tab SC, selecting high priority threads during suite execution by selecting thread tab T, reducing program and storage memory by selecting tabs PM and SM, selecting run time by selecting tab SRT, and stopping the run by selecting tab STOP. The user can utilize infinite loop tab Iloop for finding memory leaks in the system. Useful summary information such as loss of program memory, loss of storage memory, or total test execution time is provided in a summary tab SumT. The summary information for a given test result is also collected and displayed in a Summary tab SumT. The summary tab reports the number of PASS and FAIL test cases in real time. Breakout PASS and FAIL numbers for individual suites are also displayed. The configuration window's Summary tab facilitates quick navigation to an individual failure among perhaps thousands of test results. The exact source file and line number corresponding to a logged failure are automatically reported by the O/S Validator's logging APIs. Since O/S Validator provides the source code for all of its executables, being able to go directly to the source code reporting an error is a powerful adjunct to the textural descriptions of the failure. The logging options vary dramatically in their implementation and effects. The first option presumes that whenever the user runs a test suite 11 resulting in a "pass", a set of log files 15, summarizing these test results 14, automatically issues. Dependent upon the chosen logging method, the summary files 15 are created by either CEHarness 8 or the Engine 3. Basically, the Engine 3 traverses all the log files 16 in the logging directory, so the user may receive a log files list not corresponding to the test 11 being run. In order to make the summary files 15 more indicative of the run tests 11, the user can delete the log directory before running, or the user can select a logging option such as "Return only the newest summary results" which causes the Engine 3 to traverse only one log file 15 for each test 11. This means that if the user ran a file system test thirty times on a given day, there would only be one entry in the summary log for that test corresponding to the most recent execution. The summary log would have only one entry for each test 11 whose log file 15 still resides in the logged directory. The other two options are handled in the GUI 2. If the user logs onto the host 4 via a TCP/IP connection 4a, an entry goes into a log file 15 created on the user's host 4 while appearing in a log window within the GUI 2. This allows the user to examine the log files 15 within the context of the O/S Validator 1, a great advantage since the user can immediately monitor the passes, and more importantly, the failures. However, in some circumstances, there may be an excessive amount of log files 15 due to the size of the test 11 run; therefore, closing the log window LW, without opening it further, would maintain the memory of the host 4 and also impart a clear viewing area for the O/S Validator 1. Also advantageous is the closing of all log files 15 without failures. Failures indicate, to product design personnel, that the target device 9 will require further development. The user may want to keep open all the log windows F with failures by clicking an option in the logging window to keep the F window open.

When operating the present invention as shown in FIG. 5a, a window, termed Available Targets, shows the active devices on the network that are broadcasting information to the GUI 2. The active devices send a large volume of information, some of which is displayed in the Available Targets window. The user may view the information by selecting a View/Available Targets menu. Another window must be accessed to obtain the complete set of broadcasted information. This broadcast information is valuable, because it is used to initialize the connection from the Engine 3 to a particular CEHarness 8 in a test target device 9.

Referring to FIG. 11, the stress Test Settings SS are now further described. The Stress Suites 11 are manifested in a variety of forms; however, their fundamental purpose is for stressing the target device 9 by running a very long test, running multiple iterations of a short test, or electing a wide range of parameters in one test. These remain specific to their own test 11 area, for example, a Database Stress Suite only stresses the Database functionality of an O/S, such as Windows CE. The Stress Test Options are distinguishable from Stress Suites 11. The Stress Test Options are different, because they target functionality to provide more broadband stress scenarios equivalent to real world usage models. These scenarios run in conjunction with any user-selected set of test suite files 5. The Stress Test Options can and should be run both conjointly and disjointly as, in so doing, a significant boost to the range of any test plan is provided. The first two Stress Test Options are related to the memory on the target device 9. The first Stress Test Option is the Low Virtual Memory Option which greatly reduces the amount of virtual memory of the target device before running the selected tests 11. This simulates the realistic harsh circumstances that might occur when a user has opened fifteen applications, effecting a malfunction. The second Stress Test Option is the Low Storage Memory option. When selected, this second Stress Test Option fills the storage memory of the target device 9 to its maximum capacity in order to experience the target device 9 response to low storage memory solutions. In some cases, this second Stress Test Option is also good for testing application programs as contained within the target device 9 as they may depend on non-existent storage memory. The next three Stress Test Options are execution options. The first executable stress option is the infinite loop, which is ideal for long test cycles. A common problem in many device drivers is malfunction under long, intense, stressful situations. This infinite loop stress test provides a test for determining a possible breakdown. This infinite loop test runs the selected suites 11 until the user manually hits the Stop button. The next stress execution option is the configurable CPU cycle deprivation test available as a text file identified as O/S Validator \Tests\TestInputFiles called Data.txt. Two examples are provided in the file which a user may copy, reuse, or modify. The text file, Data.txt, controls the number of threads and their attributes that the user may include in his test run. In other words, the user can run his tests while other processes are consuming the CPU time, eliminating many problems including timing. The last Stress Test Option is the Random Execution. When the user selects this option, the GUI 2 will reorder the list of test suites 11 at run time so that they run in a different order. This option is ideal, because it facilitates the diagnoses of interaction problems with various components.

The remaining Test Run options are generic activities that the user may control. The first option, "Use Selected Target Exclusively," is important, because, when a target device 9 is connected over the Ethernet, other users in a subnet can access that target device 9 through the O/S Validator 1 available target devices window. This helps to create stress on the target device 9. In the event that the user wishes to isolate a problem, extra stress should not be applied. In that situations, the user should have exclusive access to the target device 9. The last Test Run Option is set Target Time which prompts the Engine 3 to send the time from the host computer 4 to the target device 9, and thereby synchronizing the target device 9 system time to the host computer 4 time. Synchronization is advantageous as the log files return with a date and time stamp related to the date and time on the target device 9. In order to keep these accurate, the user should set the target device 9 date and time. The last tab before running a test is the Environment Settings tab which contains valuable information for the various selectable environment variables. These environment settings are designed to extend and abstract the test suite files 5 by allowing the test suite files to contain environment variable instead of hard carded information. For example, the Ser. Tests take an available com-port as a parameter. If the com-port is not entered as an environment variable, the test fails, because it is unable to open a comport. All the environment variables used in the suites are provided; however, any additional environment variables may be user-added to the user-input suites. After running a test, a Test Status is available for obtaining status information for the current test run. The information is dynamically being updated.

A Suites Run section window lists the selected suites that have started. The user may open any log file from this window by selecting a desired test icon. The other icons in this control provide failure information. The failure icons are shown, by example, as a stylized beaker crossed-out with a red "X." A Test Run Summary Information keeps tracks of the number of test suite files run, suites selected, suites with a failure, and percentage of suites with a failure. On completion of a test run, the user may select a Configure Failed Suites tab prompting the appearance of a new configuration window selecting all the failed suites in the current test run, facilitating regression testing.

The remaining two sections are called Test Details. One of these Test Details section monitors the individual test cases that pass, as well as fail, which section is valuable for gauging the value of a test run. The remaining Test Details section is the Failed Suites section where all selected suites with a fail are listed by suite name, showing the number of corresponding passing and failing test cases. All this information gives the user a very good idea of the limits of his target device 9 during a test run (i.e. what passes, and more importantly what fails).

The primary object of the present invention is to properly test a port of an O/S 1001*a*, such as Windows CE. To accomplish this task, hundreds of suite tests 11 are needed and are provided by the O/S Validator 1. By example, nearly 1500 test suites 11, as grouped by the verified O/S subsystem, are provided. As indicated in FIG. 10.0, the O/S Validator 1 includes both source codes and executable codes for all tests 11, covering the major O/S 1001*a* subsystems and the common adaptation drivers, with special emphasis on subsystems historically exhibiting the most problems. O/S subsystem components tested by the O/S Validator 1 include: Ethernet/NDIS, serial port driver, display driver, touch panel driver, mouse driver, keyboard driver, OEM Adaptation Layer, and PC Card adapter driver. FIG. 15A, 15B, and 15C, together, show a table listing testing details of these system components.

As discussed above, and shown in FIG. 3, Engine 3 is linked to the GUI 2 via a component termed HarnessLink.dll 7, which is an ActiveX control. Specifically, HarnessLink.dll 7 provides a set of functions on the GUI 2 for calling (i.e. affecting) the Engine 3. A majority of HarnessLink.dll 7 function-calls set-up some parameters for the Engine 3's command line. All the initial information is passed to the Engine 3 through this command line, insuring readiness of the Engine 3 for specified execution. A plurality of GUI-related functions provide information on the command line. The information on the command line corresponds the GUI 2 information. The other major function, that HarnessLink.dll 7, serves is to communicate activity during the running of the Engine 3 by opening a named pipe. If an error or a need arises to transmit some memory information, the Engine 3 communicates through the named pipe. A named pipe insures that the communication between the Engine 3 and a specific Harness link is direct, accurate, and without any duplication problems if a plurality of Engines 3 are running. When the HarnessLink.dll 7 receives a message from the pipe, it signals the appropriate VB event which, in turn, causes the GUI 2 to take the information and process it accordingly. As described with relation to FIG. 5.0, Engine 3 communicates with one HarnessLink.dll 7, which, in turn, communicates with one CEHarness 8. The Engine 3 execution is simple: a command line is received and processed, establishing the execution socket connection to the target device, opening the pipe for communication with the GUI 2, reading the test suite files 5, and subsequently executing the tests in three phases, PreExecution, Execution, and PostExecution. The PreExecution stage establishes the error socket connection between the target device 9 and the host 4. Relevant data such as logging paths and styles, various test run information, and stress scenarios are sent during the PreExecution stage. The Execution stage involves a response to each sequential suite command. A suite command is generally sent by the host 4 and is processed by the CEHarness 8 which, in turn, responds with a socket message when execution of the command is completed. The PostExecution stage primarily involves reducing the log information and generating the summary logs. Upon completion of these summary logs, the Engine 3 exits. CEHarness 8 in test target device 9 is a significantly more complicated component than the Engine 3. This complexity is because each device 9 has one instance of CEHarness 8 at any given time; however, that device can handle a plurality of simultaneous connections, a vitally important feature to the testing methodology provided by the O/S Validator 1. When the user starts CEHarness 8, it creates two threads that endure through the entire execution time: a broadcast thread and an execution thread. This broadcast thread updates information such as the device IP, connection type, and available comports every ten seconds, sending a broadcast message at the same rate to the network. If device 9 is connected to the host computer 4 via Windows CE Services (i.e. on the NT side) and to either remnet or repllog (i.e. on the device side), the connection type will change to PPP_PEER. If this occurs, the broadcast message is sent only to the host 4 from which the target device 9 is directly connected. If the user changes the connection at some point during execution, the message is updated. Meanwhile, the execution thread waits for a connection attempt from an Engine 3. When the execution thread receives the connection, it spawns another thread, a main execution thread, that performs the various functions required. The main execution thread starts another socket for sending any error or memory information. Thus, the execution thread is event-driven, receiving a command and responding appropriately. Each connection attempt spawns its own execution thread; therefore, a single CEHarness 8 may have many active connections, extending the test functionality by running a plurality of configurations simultaneously on one target device 9, and thereby creating a more realistic stress situation.

Figure 16:
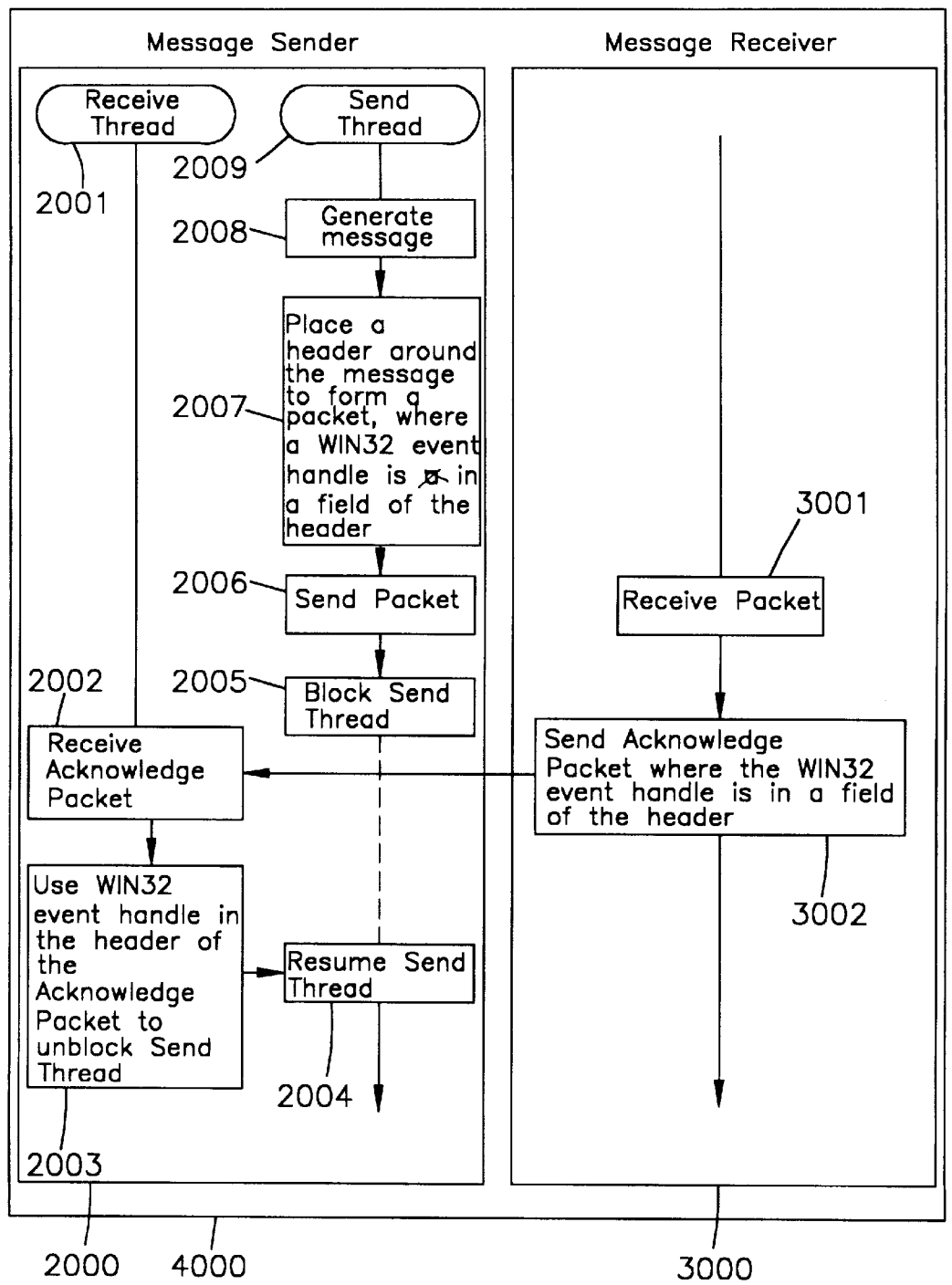
FIG. 16.0 is a flowchart illustrating the unique contemporaneous multithreading capability, with respect to acknowledgment protocol between homogeneous systems, in accordance with the present invention.

FIG. 16 is a flowchart illustrating the present invention protocol acknowledgment system 4000 comprising a message sender 2000 and a message receiver 3000. The message sender has a receive thread 2001 and a send thread 2009 which may parallel-process information. The send thread 2009 generates a message at block 2008, placing a header around the message to form a packet where a WIN32 event handle is in a field of the header, as shown in block 2007. Such packet is then sent, as per block 2006, either to block 2005 for blocking the send thread 2009 or to block 3001 for receiving the packet by the message receiver 3000, which would in turn, either send the packet having the WIN32 event handle in a field of the header, as shown by block 3002, to the receive thread 2001 via receiving block 2002 or continue processing in accordance with message receiver 3000 functions. The receive thread 2001, having received the acknowledgment packet, then uses the WIN32 event handle in the header of the acknowledgment packet for unblocking the send thread at block 2003, and then either resumes the send thread 2009 at block 2004 or continue processing of receive thread 2001 functions.

Thus, the Logging library 12, shown in FIG. 3.0, is a complex tool integrated into the O/S Validator 1 in various ways. Primarily, the Logging library 12 is integrated into the source files for the tests. The tests make calls to the library APIs whereupon the library handles all the details regarding capture and recordation of test results. The Logging library 12 also supports a variety of communication options. The recommended option is through the TCP, allowing the user to see the readout of the log files as they migrate from the TCP connection. Another communication option is direct logging to files on a device. This can be advantageous, for example, if the user wants to log to a PCMCIA card but does not want extra information to be broadcast over the network. Although, the Logging library 12 acts as the device-side component to the TCP communications, a host 4 component acts as the GUI 2-side component to the communications. This aspect of the logging library 12 provides a log window on the host 4 and color coding for the test results. By example, failure messages are displayed as a red line. The name and location of the source code file as well as the line number where the message was generated is included in the logging library 12 messages. Also, very importantly, a detailed error message is provided describing current events in the program. Each log window has a summary tab which facilitates user-access to program memory, passes, failures, and timing information. Another important feature of the log files is that they capture a large volume of information at the beginning and at the end of a test. This information provides snapshot of the Memory, System, Power, and other valuable information.

Information as herein shown and described in detail is fully capable of attaining the above-described object of the invention, the presently preferred embodiment of the present invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed:

1. A computer-based system for testing and validating an embedded operating system within a target device, comprising:

a. a host computer;
    b. a target device provided with an operating system; and
    c. an operating system testing and validating software program, said program being provided in said host computer,
        wherein said program comprises a graphical user interface program means for interfacing with a user, an engine means for communicating with said target device and responding to command from said graphical user interface, a plurality of test suites comprising at least one test for testing and validating at least one component of said operating system, and a protocol acknowledgment software package conducive to use with said target device,
        wherein said protocol acknowledgment software package utilizes an operating system-generated event handle as a member field of a protocol for releasing an execution thread which is waiting for an acknowledgment message from said target device, and
        wherein said event handle is placed in a header portion of a message packet and is sent back in said acknowledgment message, and wherein a receiving thread unblocks any send threads of execution which are waiting for said event handle in said acknowledgment message; and
    d. a logging library means for manipulating and storing test related information as generated by said operating system testing and validating software program.

2. The computer-based system, as recited in claim 1, wherein: said operating system testing and validating software program further comprises a set of functions on the graphical user interface for calling the engine means.

3. The computer-based system, as recited in claim 1, wherein said target device further comprises an event-driven application for communicating with said engine means, and
    wherein said engine means sends the events and said event driven application responds.

4. The computer-based system, as recited in claim 1, wherein
    said operating system in said target device comprises a Windows CE operating system, and
    said event handle comprises a WIN32 event handle.

5. The computer-based system, as recited in claim 1, wherein:
    said test suites comprise at least one system stress-testing routine; and
    at least one feature-and-function test.

6. The computer-based system, as recited in claim 5, wherein:
    said system stress-testing routine comprise a code base for stress testing said at least one component of said operating system,
    said at least one component of said operating system being selected from a group of operating system components comprising an Ethernet/NDIS, PCMIA, a memory, a file system, a serial port a video system having a plurality of application program interfaces, an infrared system, an original equipment manufacturer adaptation layer, a touch panel, a mouse, a keyboard, and an audio/wave system,
    said test identifying at least three defects, namely, hardware design, hardware programming, and operating system interaction, and being executed in automatic or manual mode.

7. The computer-based system, as recited in claim 1, wherein:
    said target device comprise a stand-alone unit provided with said operating system testing and validating software program for conducting validation and stress testing independent of said host computer.

8. The computer-based system, as recited in claim 1, further comprising:
    an Ethernet connection coupled to said host and to said target device for conducting testing and validation tasks.

9. The computer-based system, as recited in claim 1, wherein:
    said logging library means comprises at least one pass test result file using a WRITETESTPASS application program interface.

10. The computer-based system, as recited in claim 9, wherein:

said at least one pass test result file resides in said target device.

11. The computer-based system, as recited in claim 1, wherein:

said logging library means comprises at least one fail test result file using a WRITETESTFAIL application program interface.

12. The computer-based system, as recited in claim 11, wherein said at least one fail test result file resides in said target device.

13. A computer-based method for testing and validating an embedded operating system within a target device, comprising the steps of:

(a) providing a host computer;

(b) providing a target device having an operating system;

(c) providing an operating system testing and validating software program, said program being provided in said host computer, wherein said program comprises a graphical user interface program means for interfacing with a user, an engine means for communicating with said target device and responding to command from said graphical user interface, a plurality of test suites comprising at least one test for testing and validating at least one component of said operating system, and a protocol acknowledgment software package conducive to use with said target device, wherein said protocol acknowledgment software package utilizes an operating system-generated event handle as a member field of a protocol for releasing an execution thread which is waiting for an acknowledgment message from said target device, and wherein said event handle is placed in a header portion of a message packet and is sent back in said acknowledgment message, and wherein a receiving thread unblocks any send threads of execution which are waiting for said event handle in said acknowledgment message; and (d) providing a logging library means for manipulating and storing test related information as generated by said operating system testing and validating software program;

(e) executing said operating system testing and validating software program on said target device and testing and validating said operating system wherein said executing step comprises unblocking a send thread of execution by responding to said event handle in said acknowledgment message; and (f) generating pass and fail test results.

14. A computer-based method for testing and validating an embedded operating system, as described in claim 13 further comprising the step of:

providing said operating system testing and validating software program with a set of functions on the graphical user interface for calling the engine means.

15. A computer-based method for testing and validating an embedded operating system, as described in claim 13 further comprising the step of:

providing said target device with an event-driven application for communicating with said engine means, wherein said engine means sends the events and said event driven application responds.

16. A computer-based method for testing and validating an embedded operating system, as described in claim 13 further comprising the steps of:

(a) providing said target device with a Windows CE operating system; and (b) providing said event handle with a WIN32 event handle.

17. A computer-based method for testing and validating an embedded operating system, as described in claim 13 further comprising the step of:

providing test suites in the form of system stress-testing routine comprising a code base for stress testing said at least one component of said operating system, said at least one component of said operating system being selected from a group of operating system components comprising an Ethernet/NDIS, PCMIA, a memory, a file system, a serial port a video system having a plurality of application program interfaces, an infrared system, an original equipment manufacturer adaptation layer, a touch panel, a mouse, a keyboard, and an audio/wave system, said test identifying at least three defects, namely, hardware design, hardware programming, and operating system interaction, and being executed in automatic or manual mode.

18. A computer-based method for testing and validating an embedded operating system, as described in claim 13 further comprising the step of:

providing an Ethernet connection coupled to said host and to said target device for conducting testing and validation tasks on said target device.

19. A computer-based method for testing and validating an embedded operating system, as described in claim 13 further comprising the step of:

providing said logging library means with at least one pass test result file using a WRITETESTPASS application program interface.

20. A computer-based method for testing and validating an embedded operating system, as described in claim 13 further comprising the step of providing said logging library means with at least one fail test result file using a WRITETESTFAIL application program interface.

* * * * *

UNITED STATES PATENT AND TRADEMARK OFFICE
CERTIFICATE OF CORRECTION

PATENT NO. : 6,182,246 B1
DATED : January 30, 2001
INVENTOR(S) : Peter R. Gregory, et al.

Page 1 of 1

It is certified that error appears in the above-identified patent and that said Letters Patent is hereby corrected as shown below:

Column 6,
Line 49, after the word "Well-known" please delete [prints] and replace with -- printf --.

Column 7,
Line 39, after the word "execute." please delete [Dli] and replace with -- D11 --.

Column 8,
Line 17, after the word "tests" please delete [1] and replace with -- 11 --.

Signed and Sealed this

Twenty-first Day of August, 2001

Attest:

*Nicholas P. Godici*

NICHOLAS P. GODICI
*Attesting Officer*        *Acting Director of the United States Patent and Trademark Office*